(12) United States Patent
Yeh et al.

(10) Patent No.: US 11,666,127 B2
(45) Date of Patent: Jun. 6, 2023

(54) MOVING MECHANISM, MOBILE CARRIER, AND LUGGAGE

(71) Applicant: Wistron Corporation, New Taipei (TW)

(72) Inventors: Chi-Hsiang Yeh, New Taipei (TW); Mang-Chia Ho, New Taipei (TW); Jia-Cyuan Fan, New Taipei (TW)

(73) Assignee: Wistron Corporation, New Taipei (TW)

( * ) Notice: Subject to any disclaimer, the term of this patent is extended or adjusted under 35 U.S.C. 154(b) by 1092 days.

(21) Appl. No.: 16/379,818

(22) Filed: Apr. 10, 2019

(65) Prior Publication Data

US 2020/0178658 A1    Jun. 11, 2020

(30) Foreign Application Priority Data

Dec. 11, 2018 (TW) .................................. 107144641

(51) Int. Cl.
*A45C 5/14* (2006.01)
*B60B 33/00* (2006.01)
(Continued)

(52) U.S. Cl.
CPC .......... *A45C 5/145* (2013.01); *B60B 33/0092* (2013.01); *B60B 33/0094* (2013.01);
(Continued)

(58) Field of Classification Search
CPC ..... A45C 5/145; A45C 5/14; A45C 2005/148; A45C 5/143; A45C 5/045; A45C 13/00;
(Continued)

(56) References Cited

U.S. PATENT DOCUMENTS 2,944,636 A * 7/1960 Rockwell .................. B60T 1/04
188/29
4,324,408 A * 4/1982 Bensette ................ A63C 17/18
280/8
(Continued)

FOREIGN PATENT DOCUMENTS

CN         202680874         1/2013
CN         204378181         6/2015
(Continued)

OTHER PUBLICATIONS

Zhang et al., English Translation for CN107719024A, Sep. 21, 2017 (Year: 2017).*
(Continued)

*Primary Examiner* — Jelani A Smith
*Assistant Examiner* — Sven J Lohse
(74) *Attorney, Agent, or Firm* — JCIPRNET

(57) ABSTRACT

A moving mechanism configured to be assembled to an object to adjust a movement of the object is provided. The moving mechanism includes a bracket, a first wheel, a brake module, a control module, and a sensing module. The bracket is assembled to the object. The first wheel and the brake module are assembled to the bracket. The control module communicates with and drives the brake module. The sensing module communicates with the brake module, and the sensing module is configured to sense an orientation of the object. The control module adjusts a brake force of the brake module on the first wheel based on the orientation of the object.

17 Claims, 11 Drawing Sheets

(51) Int. Cl.
  *B62B 5/04*   (2006.01)
  *B62B 3/00*   (2006.01)
  *B60T 8/175*  (2006.01)

(52) U.S. Cl.
  CPC ........... *B60T 8/175* (2013.01); *B60B 2200/45* (2013.01); *B60B 2900/212* (2013.01); *B60B 2900/3312* (2013.01); *B60T 2201/04* (2013.01); *B62B 3/001* (2013.01); *B62B 5/0485* (2013.01)

(58) Field of Classification Search
  CPC . A45C 15/00; B60B 33/0092; B60B 33/0094; B60B 2200/45; B60B 2900/212; B60B 2900/3312; B60B 33/00; B60B 30/00; B60B 31/00; B60B 37/00; B60B 2900/521; B60B 33/0015; B60B 33/0018; B60B 33/0021; B60B 33/0023; B60T 8/175; B60T 2201/04; B62B 3/001; B62B 5/0485
  See application file for complete search history.

(56) References Cited

U.S. PATENT DOCUMENTS

| | | | | |
|---|---|---|---|---|
| 6,409,187 | B1* | 6/2002 | Crow, Jr. | B62B 5/04 188/29 |
| 10,271,623 | B1* | 4/2019 | Qi | A45C 5/03 |
| 10,933,693 | B2* | 3/2021 | Wells | B60B 33/0023 |
| 2004/0263099 | A1* | 12/2004 | Maslov | B60L 50/20 318/400.24 |
| 2011/0247903 | A1* | 10/2011 | Boukhny | B60B 33/00 188/68 |
| 2014/0216862 | A1 | 8/2014 | Chen | |
| 2017/0220040 | A1* | 8/2017 | London | B60Q 5/00 |
| 2018/0360177 | A1* | 12/2018 | Kovtun | G05D 1/0255 |

FOREIGN PATENT DOCUMENTS

| | | | | |
|---|---|---|---|---|
| CN | 204994801 | | 1/2016 | |
| CN | 205125341 | | 4/2016 | |
| CN | 105691532 | | 6/2016 | |
| CN | 105984541 | | 10/2016 | |
| CN | 205757781 | | 12/2016 | |
| CN | 205947333 | | 2/2017 | |
| CN | 107719024 A | * | 2/2018 | ............. A45C 13/00 |
| CN | 108693871 | | 10/2018 | |
| TW | M390690 | | 10/2010 | |
| TW | M411829 | | 9/2011 | |
| WO | WO-9912794 A1 | * | 3/1999 | ............. B62D 7/026 |

OTHER PUBLICATIONS

"Office Action of Taiwan Counterpart Application," dated Apr. 2, 2019, p. 1-p. 26.
"Office Action of China Counterpart Application", dated Sep. 3, 2021, p. 1-p. 10.
"Office Action of China Counterpart Application", dated Mar. 26, 2021, p. 1-p. 12.

* cited by examiner

MOVING MECHANISM, MOBILE CARRIER, AND LUGGAGE

CROSS-REFERENCE TO RELATED APPLICATION

This application claims the priority benefit of Taiwan application serial no. 107144641, filed on Dec. 11, 2018. The entirety of the above-mentioned patent application is hereby incorporated by reference herein and made a part of this specification.

BACKGROUND OF THE INVENTION

1. Field of the Invention

The present invention relates to a moving mechanism, a mobile carrier, and a luggage.

2. Description of Related Art

To ensure labor-saving dragging, an existing luggage is generally provided with wheels at the bottom for weight bearing and for convenience of pulling, to improve mobility. However, there is no fixing structure at the bottom of the luggage. Therefore, as long as a user's hands leaves the luggage, whether the luggage is placed on flat or non-horizontal ground, or even in an environment in which the luggage may be pushed, the luggage automatically slips or slides toward a lower part at an acceleration, causing overturning, collision, or the like that easily breaks the luggage. Consequently, inconvenience in use is easily caused and practicality of the luggage is reduced.

SUMMARY OF THE INVENTION

The present invention provides a moving mechanism, a mobile carrier, and a luggage, to enable the mobile carrier or the luggage to have both mobility and a braking ability by using the moving mechanism.

The moving mechanism provided in the present invention is configured to be assembled to an object to adjust a movement of the object. The moving mechanism includes a bracket, a first wheel, a brake module, a control module, and a sensing module. The bracket is assembled to the object. The first wheel and the brake module are assembled to the bracket. The control module communicates with and drives the brake module. The sensing module communicates with the control module and is configured to sense an orientation of the object. The control module adjusts a brake force of the brake module on the first wheel based on the orientation of the object.

The mobile carrier provided in the present invention includes a body and a moving mechanism. The moving mechanism includes a bracket, a first wheel, a brake module, a control module, and a sensing module. The bracket is assembled to the body. The first wheel and the brake module are assembled to the bracket. The control module communicates with and drives the brake module. The sensing module communicates with the control module and is configured to sense an orientation of the body. The control module adjusts a brake force of the brake module on the first wheel based on the orientation of the body.

The luggage provided in the present invention is configured to carry an object, and the luggage includes a case body and a moving mechanism. The moving mechanism is assembled to the case body and includes a bracket, a first wheel, a brake module, a control module, and a sensing module. The bracket is assembled to the case body. The first wheel and the brake module are assembled to the bracket. The control module communicates with and drives the brake module. The sensing module communicates with the control module and is configured to sense an orientation of the case body. The control module adjusts a brake force of the brake module on the first wheel based on the orientation of the case body.

Based on the foregoing, in the moving mechanism and the mobile carrier or the luggage applying the moving mechanism, the sensing module performs an orientation sensing action on a related object, that is, the body of the mobile carrier or the case body of the luggage, to learn whether the mobile carrier or the luggage moves in a current environment, so that the control module can drive the brake module and adjust the brake force of the brake module on the first wheel. That is, when the mobile carrier or the luggage slips due to a located environment, the brake module is used to provide a brake effect for the first wheel, to avoid possible damage that may be caused to the mobile carrier or the luggage. Moreover, the control module may further adjust a brake force on the first wheel depending on a current condition, so that a user can use the mobile carrier or the luggage in a more labor-saving and convenient way.

To make the foregoing features and advantages of the present invention clearer and more comprehensible, specific embodiments are described in detail below with the accompanying drawings.

DESCRIPTION OF THE EMBODIMENTS

A mobile carrier provided in the present invention includes a body and a moving mechanism, and the body is assembled to the mobile carrier by using the moving mechanism, so as to have an ability to move or stop. In the following embodiments, a luggage is used as an example, but a form of the mobile carrier is not limited thereto. For example, in other embodiments, the mobile carrier may alternatively be a trolley, a walking aid, or the like, which may all apply a moving mechanism to achieve a required effect of movement adjustment.

Figure 1:
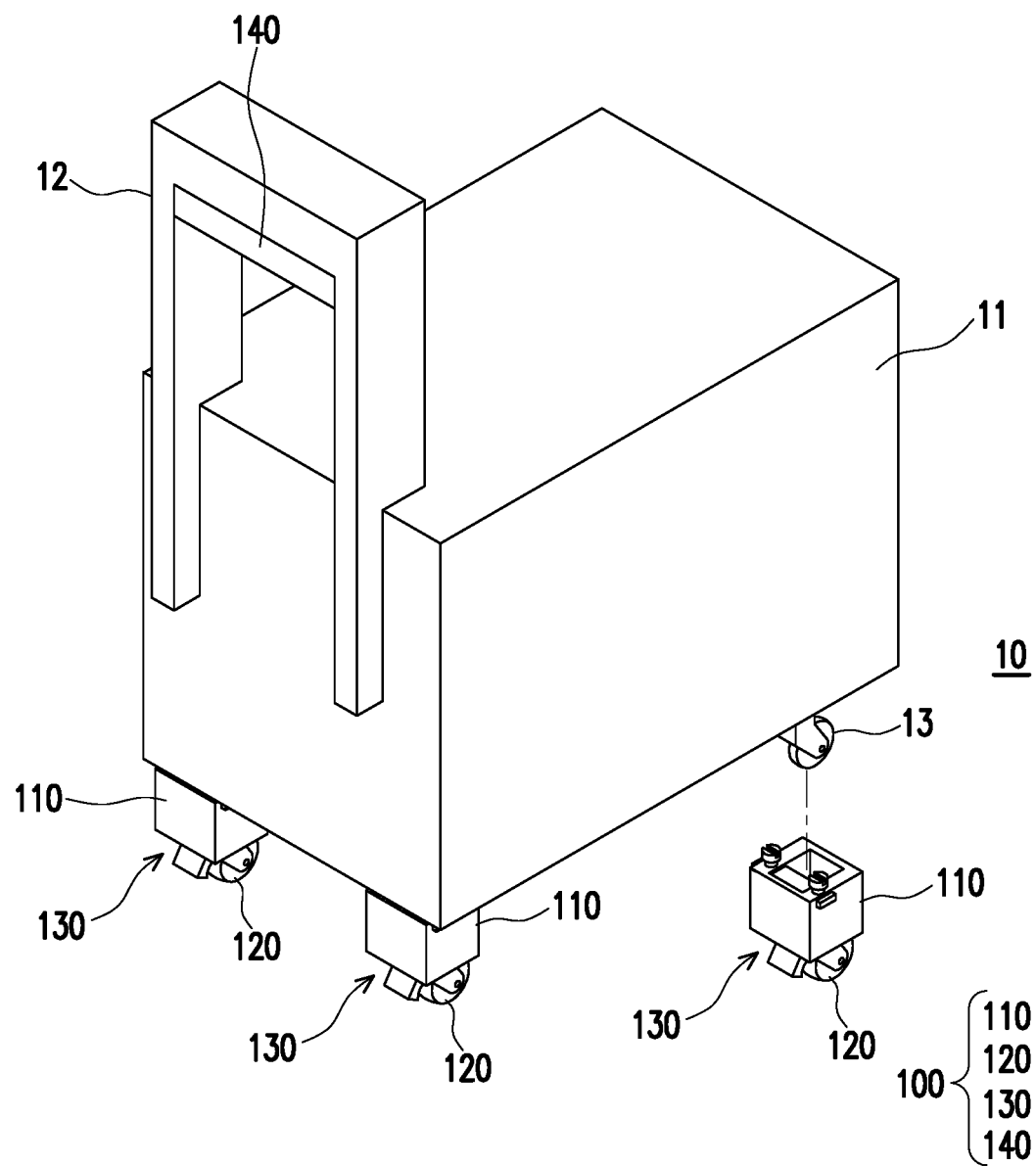
FIG. 1 is a schematic diagram of a luggage according to an embodiment of the present invention.
Figure 2:
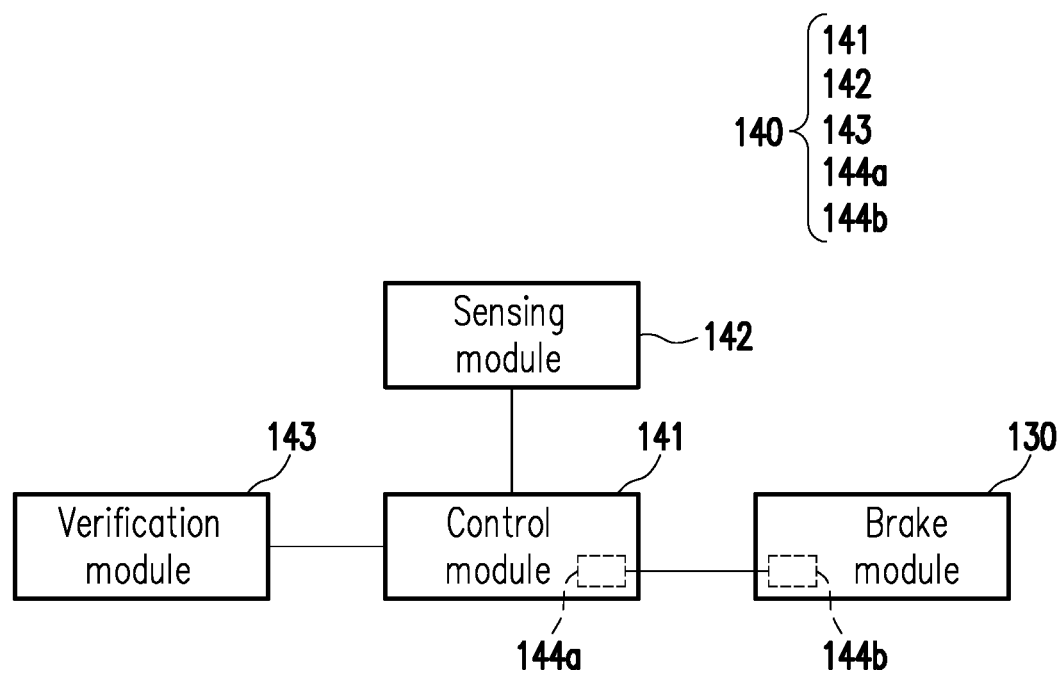
FIG. 2 is a relationship diagram of communication between related modules of the luggage in FIG. 1.

FIG. 1 is a schematic diagram of a luggage according to an embodiment of the present invention. FIG. 2 is a relationship diagram of communication between related modules of the luggage in FIG. 1. Referring to FIG. 1 and FIG. 2, in this embodiment, a luggage 10 includes a case body 11, a handlebar 12, a plurality of second wheels 13 (which are shown as four second wheels herein but are not limited thereto), and a plurality of moving mechanisms 100 (which are shown as four moving mechanisms herein but are not limited thereto), where the case body 11 of the luggage 10 may be considered as a body of a mobile carrier, to be used as an object to which these moving mechanisms 100 are assembled. Moreover, in FIG. 1, that only one moving mechanism 100 is detached from the case body 11 is used as an example to describe a relationship among the moving mechanism 100, the case body 11, and the second wheel 13.

As shown in FIG. 1, the moving mechanism 100 in this embodiment is coupled to the second wheel 13 to replace the second wheel 13, that is, the luggage 10 may still be dragged to move by using the second wheel 13 thereof before the moving mechanism 100 is mounted on the luggage 10. On the contrary, once the moving mechanism 100 is assembled thereto, wheels of the moving mechanism 100 are used as contact interfaces between the luggage 10 and the ground. In other words, the moving mechanism 100 in this embodiment may be considered as an external connection mechanism of the luggage 10, and may be assembled or disassembled according to a requirement of a user, to enable the moving mechanism 100 to be applicable to a type of existing luggage, so as to improve applicability and convenience thereof. Subsequently, a coupling relationship between the moving mechanism 100 and the case body 11 will be further described. Certainly, in another non-illustrated embodiment, alternatively, the moving mechanism 100 may completely replace the second wheel 13, that is, in a manufacturing process of the luggage, the moving mechanism 100 instead of the second wheel 13 is assembled to the case body 11.

Moreover, still referring to FIG. 1 and FIG. 2, each moving mechanism 100 includes a bracket 110, a first wheel 120, a brake module 130, and an integrated electronic module 140. The bracket 110 is assembled to the bottom of the case body 11, and is actually externally connected to the second wheel 13. The first wheel 120 and the brake module 130 are assembled to the bracket 110. Herein, the integrated electronic module 140 includes a control module 141, a sensing module 142, a verification module 143, and communication units 144a and 144b. The communication units 144a and 144b are respectively disposed in the control module 141 and the brake module 130 to communicate with the control module 141 and the brake module 130, so as to enable the control module 141 to drive the brake module 130. The sensing module 142 communicates with the control module 141 and is configured to sense an orientation of the luggage 10, to enable the control module 141 to adjust a brake force of the brake module 130 on the first wheel 120 based on the orientation of the object (which is the case body 11 of the luggage 10 in this embodiment). It should be noted that the foregoing and subsequent descriptions of the related electronic modules are all briefly and schematically provided in the drawings, and do not limit structural characteristics (appearances and positions) thereof. In addition, in this embodiment, although the control module 141, the sensing module 142, and the verification module 143 constitute the integrated electronic module 140, and the control module 141 communicates with the brake module 130 by using the communication units 144a and 144b, this does not limit communication forms between the electronic modules, that is, the electronic modules may all be in wired communication or wireless communication with each other by using a known technology.

In this embodiment, the sensing module 142 includes an acceleration sensor disposed on the case body 11, configured to determine a tilt status of the case body 11 by sensing an acceleration amount of the object, and the control module 141 adjusts a brake force of the brake module 130 on the first wheel 120 based on the tilt status of the case body 11. For example, the sensing module 142 continuously collects information about an acceleration of the case body 11, and provides the information for the control module 141 to perform determining so as to check whether a preset value is reached. When the luggage 10 is located on a tilted ground, an acceleration is generated because of a gravity. When a value obtained by the sensing module 142 exceeds the preset value at this moment, the control module 141 activates a braking function of the brake module 130 to provide a stop function when the luggage 10 moves, so as to prevent the luggage 10 from continuously moving because of the tilted ground, and effectively avoid toppling or impact that may be caused once the luggage 10 continues to move. Herein, the preset value is not limited, and may be appropriately adjusted depending on a condition of the luggage 10 and a use requirement.

In addition, in another embodiment, in addition to the foregoing acceleration sensor, the sensing module 142 further includes a gyroscope disposed on the case body 11, configured to obtain an impulse of the case body 11. The control module 141 adjusts a brake force of the brake module 130 on the first wheel 120 based on the tilt status (obtained by using the acceleration sensor) of the case body 11 and the impulse (obtained by using the gyroscope). For example, when the luggage 10 is in a compartment of a vehicle together with a user, at a moment when the vehicle is started from a stationary state, the vehicle generates an impulse to the luggage 10. Therefore, this case can be effectively coped with by using the gyroscope. That is, when the foregoing impulse causes the luggage 10 to move, the control module 141 receives a sensing result of the tilt status and the impulse and drives the brake module 130 to prevent the luggage 10 from continuously moving.

Based on the foregoing, herein the adjusting a brake force of the brake module 130 on the first wheel 120 includes: making the first wheel 120 directly stop, or changing braking the first wheel 120, to enable the first wheel 120 to complete stopping or maintain downshifting rolling in a required time. For example, when the user drags the luggage 10 and walks on a downhill section, to prevent the user from losing control of the luggage 10 due to an excessively fast movement speed of the luggage 10, the control module 141 is used to adjust a brake force applied by the brake module 130 on the first wheel 120, so that the first wheel 120 reaches a state in which a speed is reduced but rolling is maintained, thereby reducing a burden on the user.

Figure 3A:
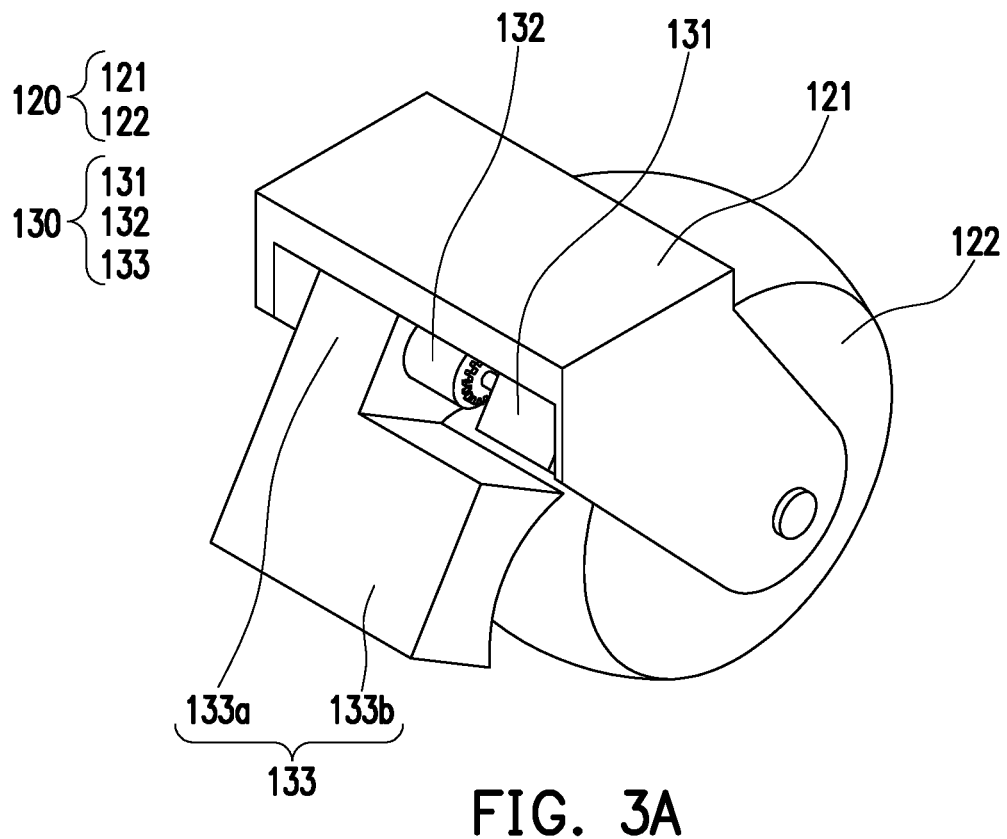
FIG. 3A and FIG. 3B are schematic diagrams of a brake module in FIG. 1 in different states.
Figure 3B:
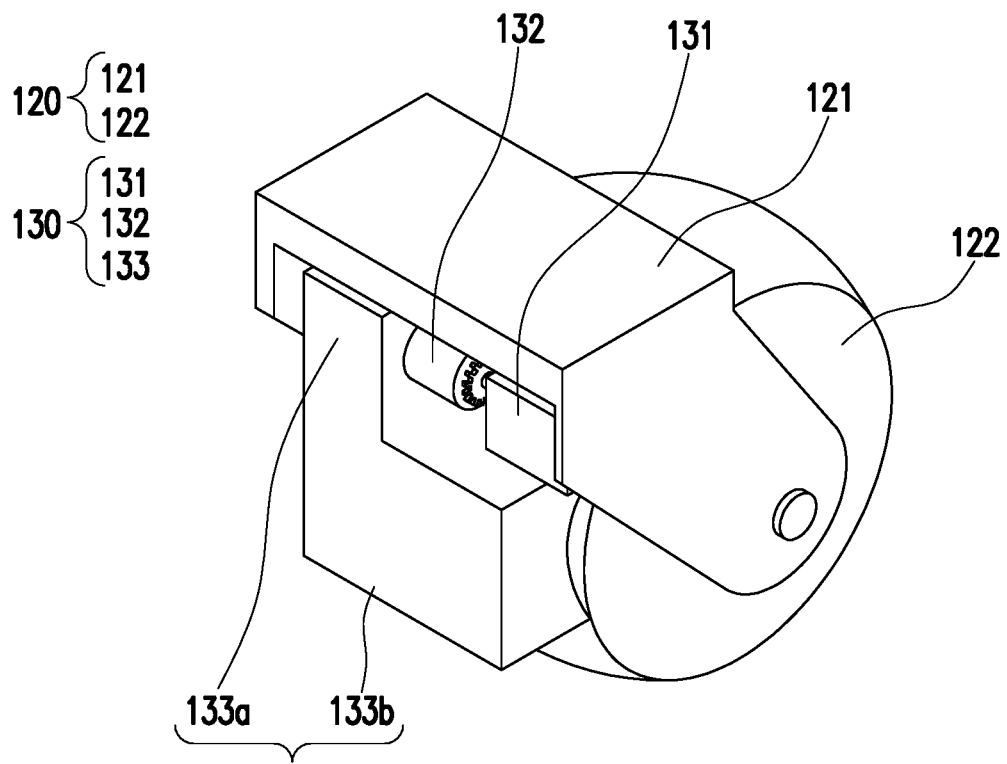
Figure 3C:
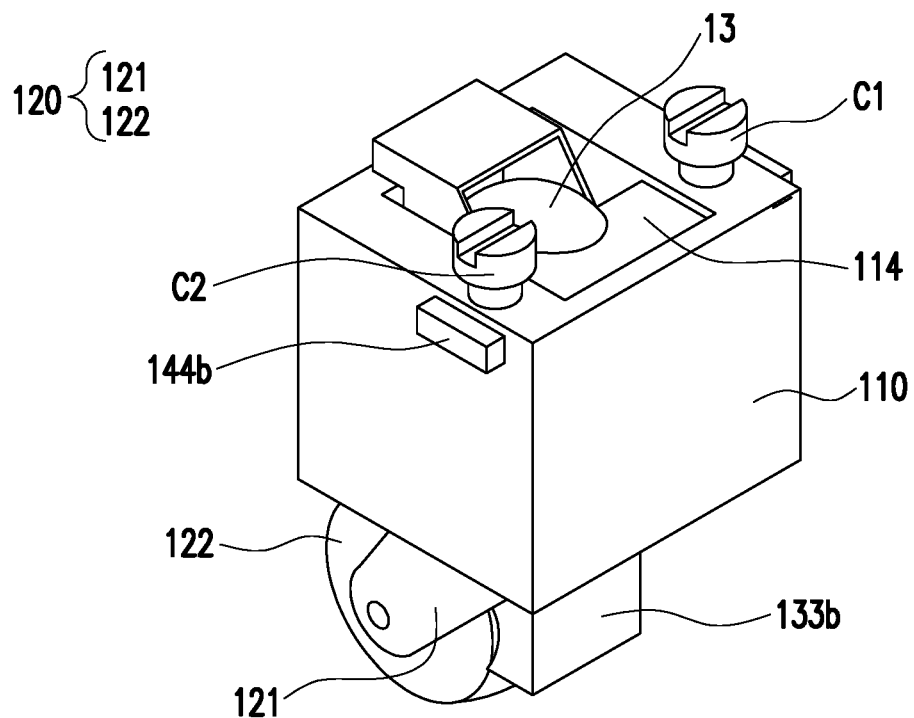
FIG. 3C illustrates a state in which a moving mechanism is coupled to a second wheel.

FIG. 3A and FIG. 3B are schematic diagrams of the brake module in FIG. 1 in different states. FIG. 3C illustrates a state in which a moving mechanism is coupled to a second wheel. Referring to FIG. 3A to FIG. 3C, in this embodiment, the communication unit 144b is disposed on the bracket 110, the brake module 130 includes a power source 131 (for example, a motor), a transmission shaft 132, and a brake pad 133, the power source 131 is disposed on a wheel carrier 121 of the first wheel 120 and is electrically connected to the communication unit 144b, the transmission shaft 132 is connected between the power source 131 and the brake pad 133, and a wheel 122 is rollably and pivotally connected to the wheel carrier 121 so that the power source 131 and the transmission shaft 132 are located above the wheel 122. Further, the brake pad 133 includes a connection portion 133a connected to the transmission shaft 132 and a brake portion 133b extending from the connection portion 133a, the power source 131 drives the connection portion 133a by using the transmission shaft 132 to swing the brake portion 133b, and the wheel 122 is located on a swing path of the brake portion 133b. In this way, the control module 141 can adjust a relationship between the brake pad 133 and the wheel 122 by using the power source 131 and the transmission shaft 132. In other words, when the brake pad 133 abuts against the wheel 122, as shown in FIG. 3B, a friction force is generated and a braking effect can be achieved. Moreover, magnitude of the friction force can be appropriately adjusted based on abutting between the brake portion 133b and the wheel 122.

Figure 3D:
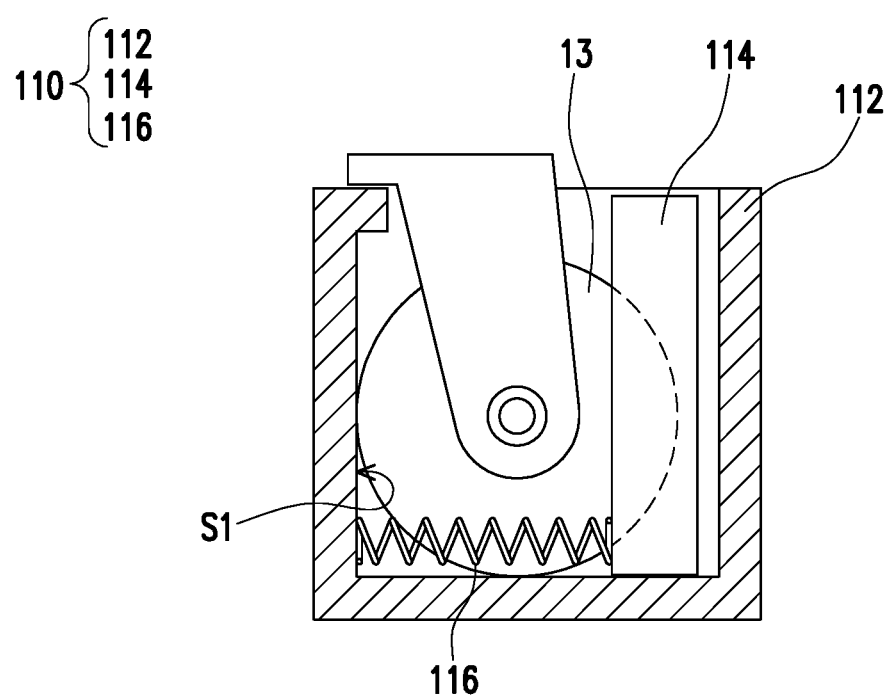
FIG. 3D is a partial cross-sectional view of FIG. 3C.

FIG. 3D is a partial cross-sectional view of FIG. 3C. Referring to FIG. 3C and FIG. 3D, in this embodiment, the bracket 110 is assembled to the case body 11 (illustrated in FIG. 1) by using lock accessories C1 and C2, to wrap the second wheel 13. The bracket 110 includes an outer frame 112 and a movable partition 114 configured in the outer frame 112, and the second wheel 13 abuts between the movable partition 114 and the outer frame 112. Further, the bracket 110 further includes an elastic member 116, connecting the outer frame 112 and the movable partition 114, and the elastic member 116 constantly drives the movable partition 114 to move toward an inner side Si of the outer frame 112, to enable the second wheel 13 to be fitted between the movable partition 114 and the inner side Si. Accordingly, the moving mechanism 100 can be adapted to second wheels 13 of different sizes, thereby improving applicability of the moving mechanism 100 to an existing luggage already having a second wheel 13.

Figure 4A:
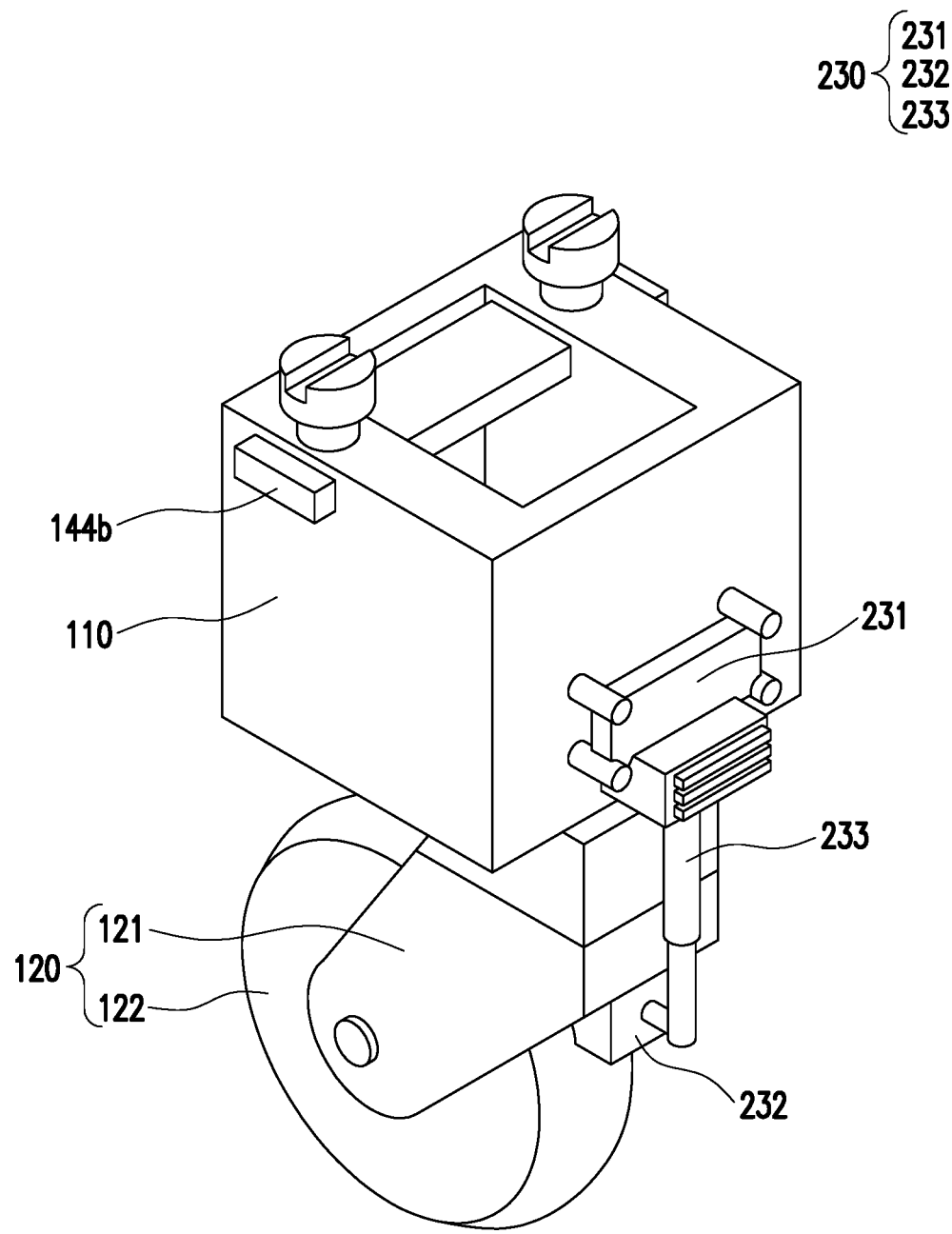
FIG. 4A is a schematic diagram of a brake module according to another embodiment of the present invention.
Figure 4B:
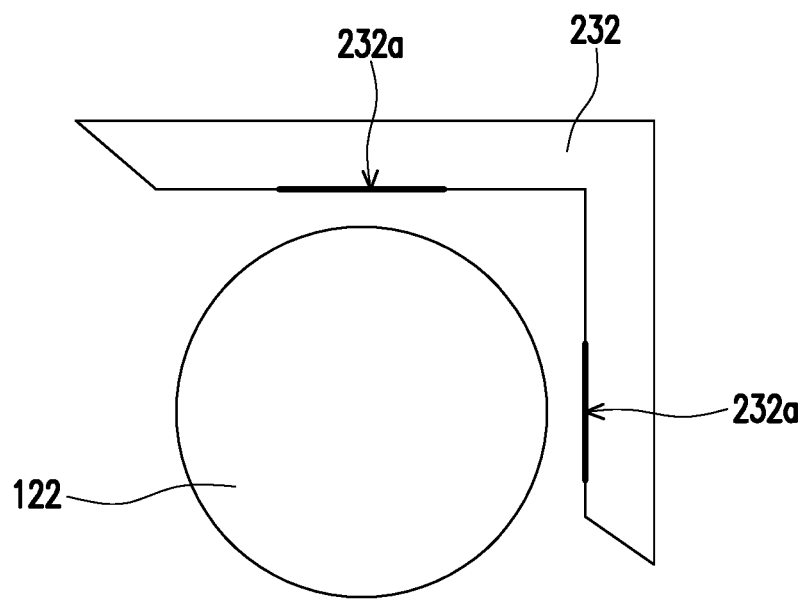
FIG. 4B and FIG. 4C are simple schematic diagrams of a brake module in different states.
Figure 4C:
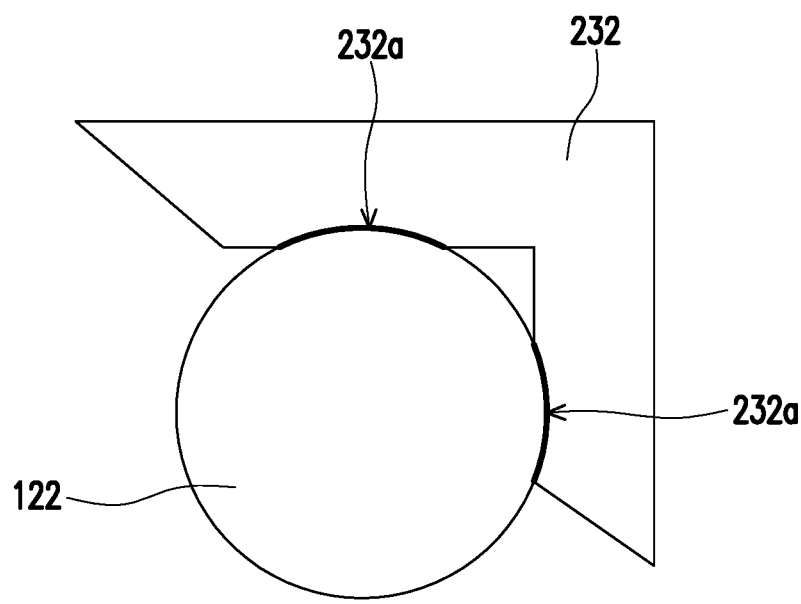

FIG. 4A is a schematic diagram of a brake module according to another embodiment of the present invention. FIG. 4B and FIG. 4C are simple schematic diagrams of a brake module in different states. Referring to FIG. 4A to FIG. 4C, in this embodiment, a brake module 230 includes an air pump 231, an inflatable brake pad 232, and a pipe 233 connecting the air pump 231 and the inflatable brake pad 232. The air pump 231 is assembled to the bracket 110, the inflatable brake pad 232 is disposed on the wheel carrier 121 of the first wheel 120, and is connected to the air pump 231 by using the pipe 233, and the communication unit 144b is disposed on the bracket 110 and is electrically connected to the air pump 231.

Further, the inflatable brake pad 232 includes at least one brake portion (in this embodiment, two brake portions 232a are used as an example, but it is not limited herein) facing toward the wheel 122. Accordingly, the control module 141 inflates the inflatable brake pad 232 by using the air pump 231, to enable the brake portion 232a to abut against the wheel 122. On the contrary, the control module 141 deflates the inflatable brake pad 232 by using the air pump 231, to enable the brake portion 232a to be away from the wheel 122. Similarly, the control module may also adjust inflation and deflation of the inflatable brake pad 232 by using the air pump 231, to change a degree of abutting of the brake portion 232a against the wheel 122, so as to adjust a relationship between the inflatable brake pad 232 and the first wheel 120, that is, the state of direct stopping or downshifting rolling described in the foregoing embodiment.

Figure 5A:
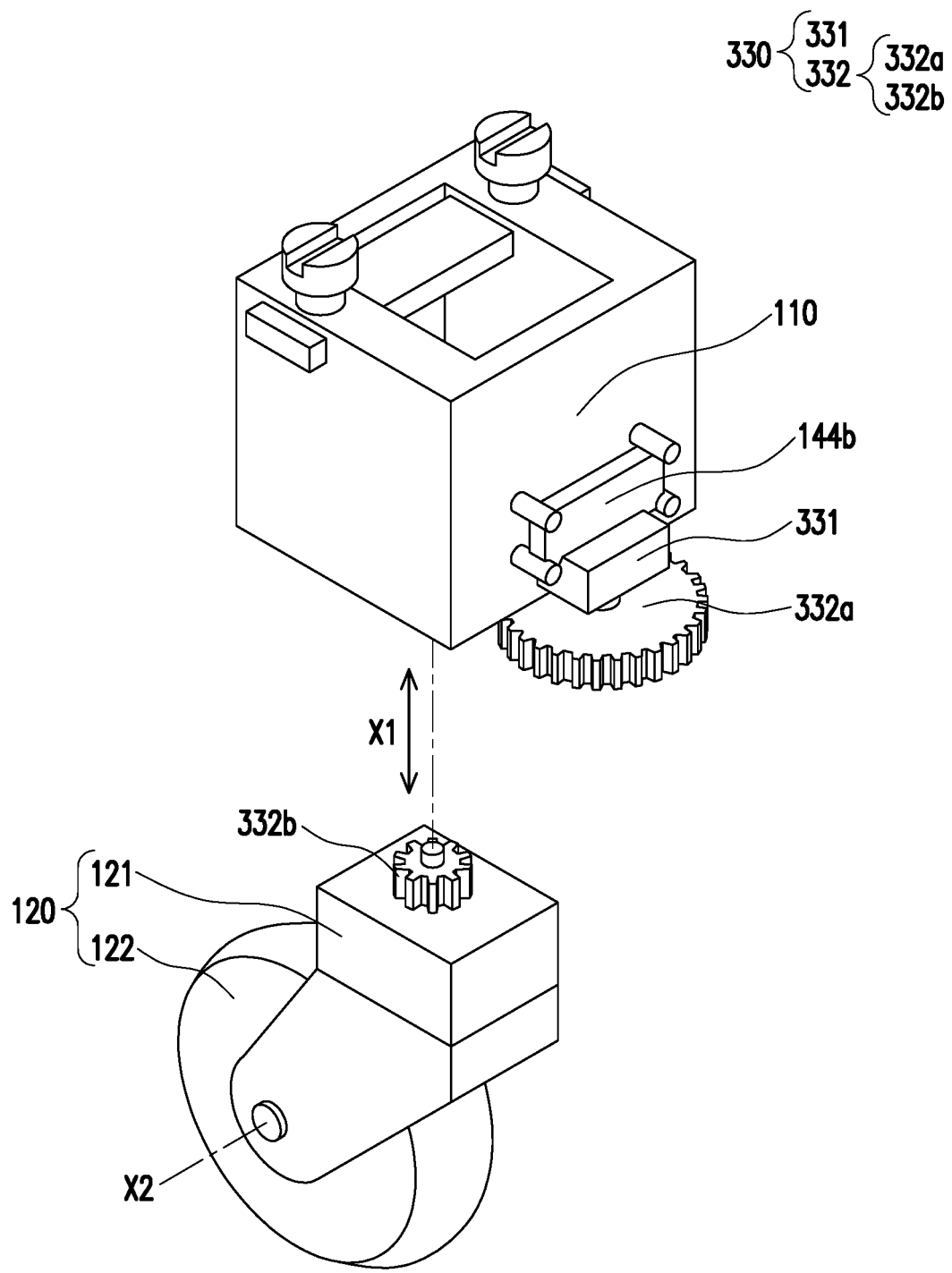
FIG. 5A is an exploded view of a brake module according to another embodiment of the present invention.
Figure 5B:
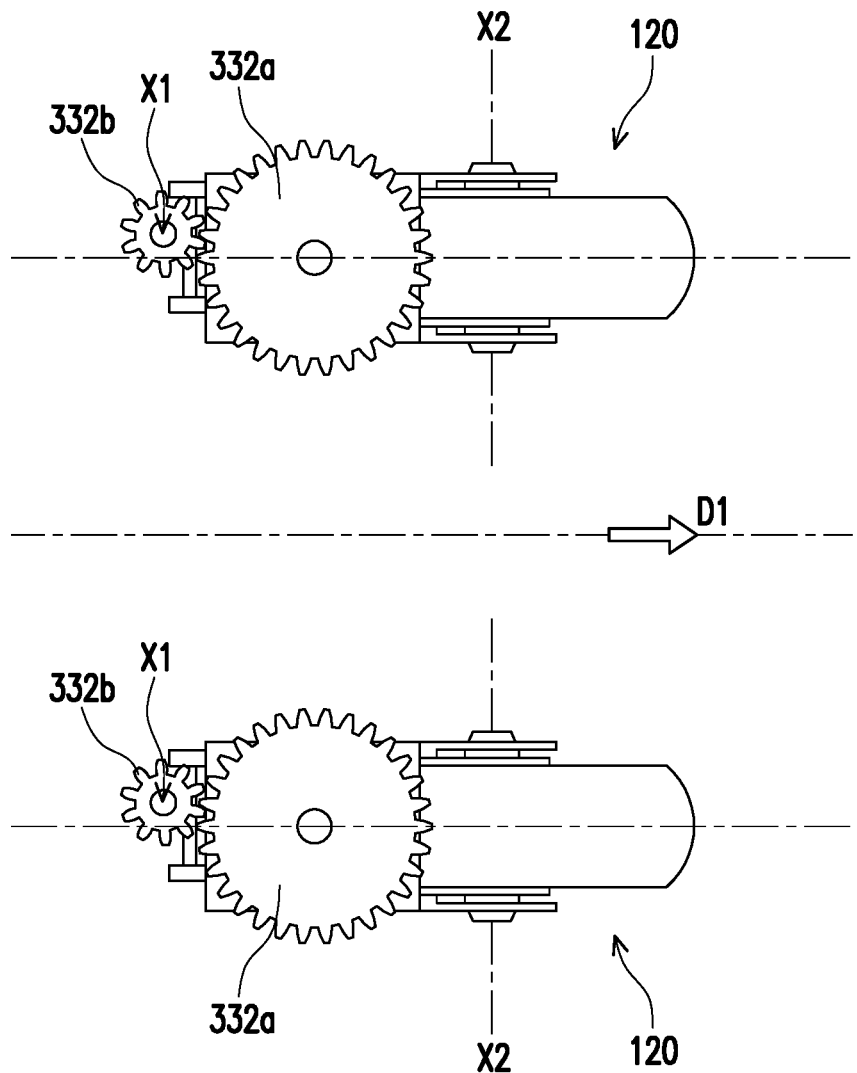
FIG. 5B and FIG. 5C are schematic diagrams illustrating whether a brake module generates a braking effect.
Figure 5C:
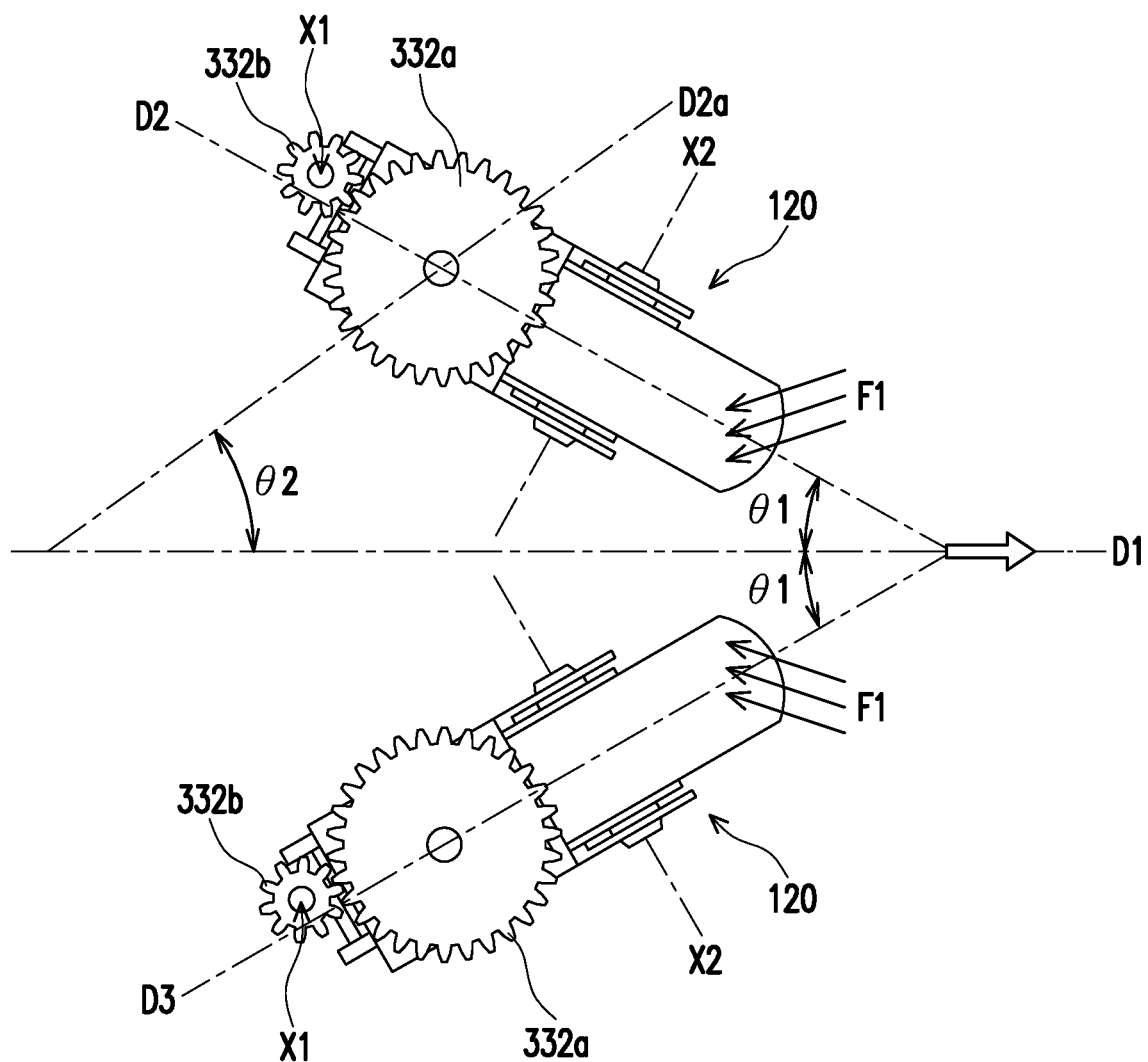

FIG. 5A is an exploded view of a brake module according to another embodiment of the present invention. FIG. 5B and FIG. 5C are schematic diagrams illustrating whether a brake module generates a braking effect. Referring to FIG. 5A to FIG. 5C, different from the foregoing embodiment, a brake module 330 in this embodiment does not need to use the foregoing brake pad. Herein, the brake module 330 includes a power source 331 and a transmission assembly 332, the power source 331 is disposed on the bracket 110 and is electrically connected to the communication unit 144b, and the transmission assembly 332 is a gear set, and includes a first gear 332a and a second gear 332b, where the first gear 332a is connected to the power source 331. The first wheel 120 is the same as that in the foregoing embodiment, the wheel carrier 121 thereof is pivoted to the bracket 110 along a first axis X1, and a wheel 122 is pivotally connected to the wheel carrier 121 along a second axis X2. The first axis X1 is orthogonal to the second axis X2. The second gear 332b is engaged with the first gear 332a when the wheel carrier 121 of the first wheel 120 is pivoted to the bracket 110. Therefore, power from the power source 331 can be transferred to the wheel carrier 121 through the first gear 332a and the second gear 332b, to drive the wheel carrier 121 to steer relative to the first axis X1.

Accordingly, as shown in FIG. 5B, herein, using two first wheels 120 as an example and using a travelling direction D1 of the luggage 10 as a reference, when the first wheels 120 both are parallel to the travelling direction D1, no braking effect is generated in this case, that is, the first wheels 120 normally roll and the luggage 10 normally travels. Referring to FIG. 5C, when the control module 141 drives the first wheels 120 to steer relative to the first axis X1 by using the power source 331 and the transmission assembly 332, and to enable axial directions D2 and D3 of the first wheels 120 to be different from the travelling direction D1 so that an angle θ1 exists, the first wheels 120 and the ground generate an additional friction force F 1 in this case, so that a braking effect is generated to the first wheels 120. In other words, the braking in this embodiment is a plough-type brake. The first wheel 120 is caused to steer and turns to a direction different from the travelling direction D1, to achieve a speed reduction or stationary effect. Herein, a size of the angle θ1 is not limited, and is correspondingly adjusted based on a required braking degree. In addition, FIG. 5C further illustrates another axial direction D2a of one of the first wheels 120, representing that when there is an angle θ2 between the first wheel 120 and the travelling direction D1 (that is, the axial directions D3 and D2a of the two first wheels 120 are parallel with each other but still tilt relative to the travelling direction D1), a corresponding braking effect can also be generated.

Figure 6:
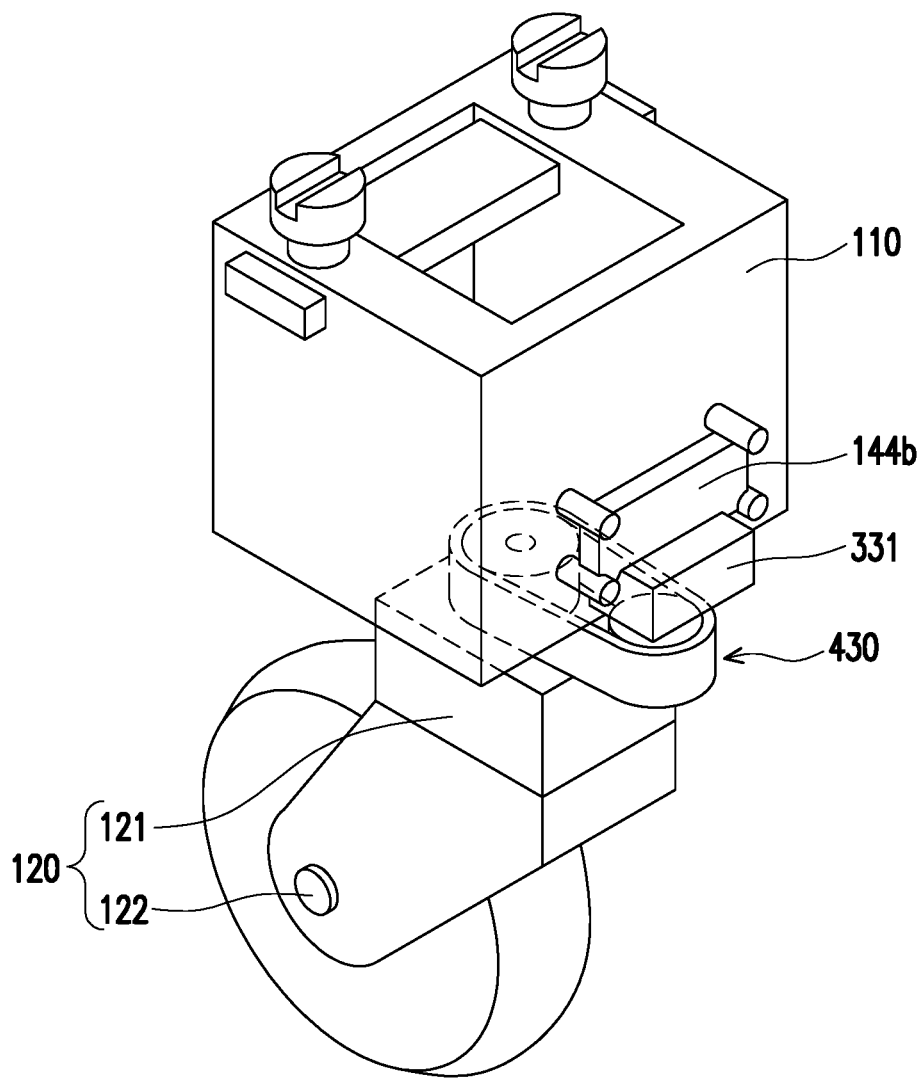
FIG. 6 is a schematic diagram of a brake module according to another embodiment of the present invention.

FIG. 6 is a schematic diagram of a brake module according to another embodiment of the present invention. In this embodiment, a transmission assembly 430 of the brake module is a pulley set, which can also achieve an effect that the first wheel 120 is enabled to steer to generate braking as in the foregoing embodiment.

Figure 7:
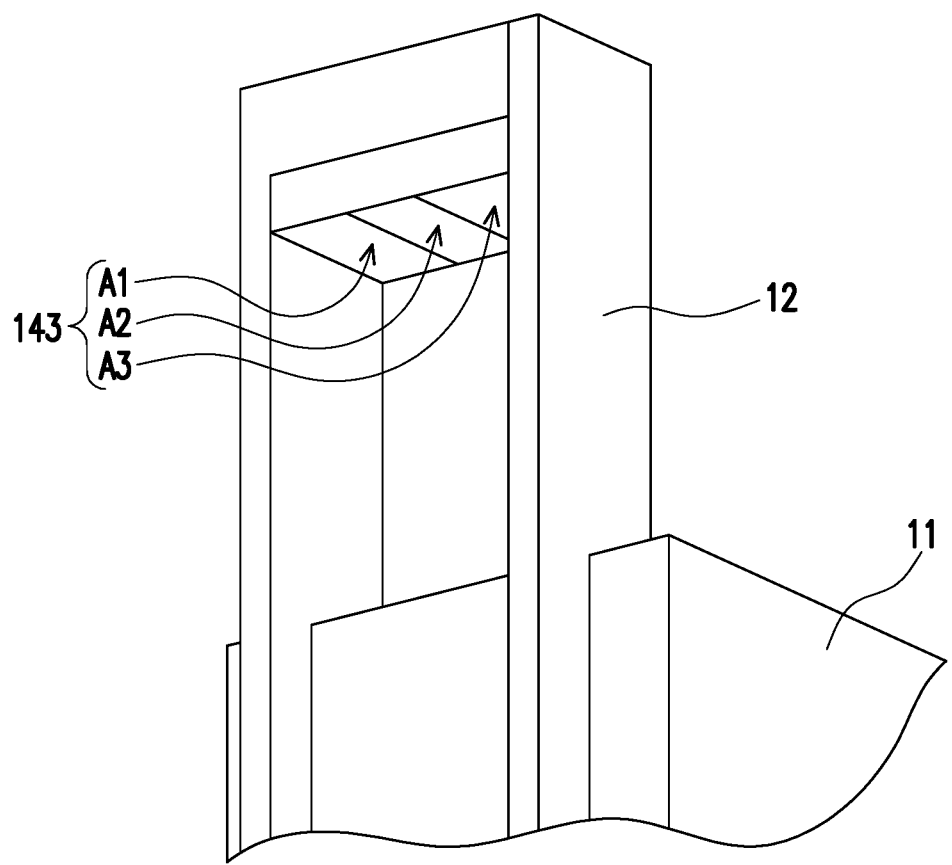
FIG. 7 is a partial schematic diagram of the luggage in FIG. 1 from another view.

FIG. 7 is a partial schematic diagram of the luggage in FIG. 1 from another view. Referring to FIG. 1, FIG. 2, and FIG. 7, in this embodiment, the verification module 143 communicates with the control module 141 (not shown), and the user gets control of the control module 141 through verification of the verification module 143. Further, the verification module 143 is a touch sensor, and is disposed on the handlebar 12 of the luggage 10, so as to be controlled by the user. For example, the verification module 143 is configured to sense whether the user touches the handlebar 12 to determine whether the luggage 10 is controlled by the user at this moment. That is, the user may touch the verification module 143 when holding the handlebar 12. In this case, the control module 141 can release the foregoing braking effect on the brake module 130, to avoid a deadlock of the first wheel 120.

Moreover, when the user drags the luggage 10 and walks in a downhill section, the luggage 10 is in a tilt state while the handlebar 12 is held by the user. The control module 141 drives the brake module 130 to provide a speed reduction effect based on the state, and once the user releases the handlebar 12 while the luggage 10 is still in the tilt state, the control module 141 drives the brake module 130 to generate a stopping effect on the first wheel 120.

In addition, the verification module 143 includes a plurality of exposed touch areas A1, A2, and A3, and provides a specific verification mechanism, for example, the user needs to touch a specific touch area or uses a specific control sequence to pass verification, to prevent another person from randomly dragging the luggage 10. Certainly, in another non-illustrated embodiment, the verification module may further include a fingerprint recognition function, to improve an anti-theft effect of the luggage.

Based on the foregoing, in the foregoing embodiments of the present invention, the luggage can provide a braking effect on the first wheel thereof by using the moving mechanism. Further, the sensing module transfers sensed orientation information of the luggage to the control module, so that the control module performs determining and drives the brake module accordingly. That is, when the luggage is in a movement state, the control module drives the brake module to generate a brake force on the first wheel, so as to generate a braking effect on the luggage and prevent the luggage from continuously moving or slow down the luggage. The brake module achieves the required braking effect by using a mobile brake pad or an inflatable brake pad, or by steering the first wheel.

Moreover, the control module may further adjust a brake force on the first wheel depending on a current condition, for example, providing a stopping or speed reduction effect, so that the user can use the luggage in a more labor-saving and convenient way.

In addition, the luggage is further provided with the verification module, used as a basis for the control module to determine whether the user gets control of the luggage, to further limit the foregoing braking effect, thereby providing a relatively good operation sense for the user and providing an anti-theft effect.

Although the present invention is already disclosed above by using the embodiments, the embodiments are not intended to limit the present invention. Any person of ordinary skill in the art can make some changes or polishing without departing from the spirit and scope of the present invention. Therefore, the protection scope of the present invention shall be subject to the scope defined by the appended claims.

What is claimed is:

1. A moving mechanism, configured to be assembled to an object to adjust a movement of the object, comprising:
   a bracket, assembled to the object;
   a first wheel and a brake module, assembled to the bracket;
   a control module, communicating with and driving the brake module; and
   a sensing module, comprising an acceleration sensor, wherein the sensing module communicates with the control module, wherein the control module adjusts a brake force of the brake module on the first wheel based on the orientation of the object,
   wherein the object comprises a second wheel, and the bracket is detachably and externally connected to the second wheel,
   wherein the bracket comprises an outer frame and a movable partition configured in the outer frame, and the second wheel abuts between the movable partition and the outer frame.

2. The moving mechanism according to claim 1, wherein the acceleration sensor, configured to obtain a tilt status of the object, and the control module adjusts the brake force of the brake module on the first wheel based on the tilt status of the object.

3. The moving mechanism according to claim 2, wherein the sensing module further comprises a gyroscope, configured to obtain an impulse of the object, and the control module adjusts the brake force of the brake module on the first wheel based on the tilt status and the impulse of the object.

4. The moving mechanism according to claim 1, wherein the bracket further comprises an elastic member connecting the outer frame and the movable partition, and the elastic member constantly drives the movable partition to move toward a side of the outer frame, so that the second wheel is fitted between the movable partition and the side.

5. The moving mechanism according to claim 1, wherein the brake module comprises:
   a power source, disposed on the bracket; and
   a transmission assembly, connected between the power source and the first wheel, wherein the control module drives the first wheel to steer by using the power source and the transmission assembly, and the first wheel turns to a direction different from a travelling direction of the object.

6. The moving mechanism according to claim 5, wherein the transmission assembly comprises a gear set or a pulley set.

7. The moving mechanism according to claim 5, wherein the first wheel comprises:
   a wheel carrier, freely pivoted to the bracket along a first axis; and
   a wheel, pivotally connected to the wheel carrier to be rolled about a second axis, wherein the transmission assembly is connected between the power source and the wheel carrier to drive the wheel carrier to steer by using the first axis as a center of rotation.

8. The moving mechanism according to claim 7, wherein the first axis is orthogonal to the second axis.

9. The moving mechanism according to claim 1, wherein the brake module comprises:
   a power source, disposed on the bracket;
   a transmission shaft; and
   a brake pad, wherein the transmission shaft is connected between the power source and the brake pad, and the control module adjusts a relationship between the brake pad and the first wheel by using the power source and the transmission shaft.

10. The moving mechanism according to claim 9, wherein the first wheel comprises:
   a wheel carrier, pivoted to the bracket, wherein the power source is disposed on the wheel carrier; and
   a wheel, rollably and pivotally connected to the wheel carrier, wherein the brake pad comprises a connection portion connected to the transmission shaft and a brake portion extending from the connection portion, the power source drives the connection portion by using the transmission shaft to swing the brake portion, and the wheel is located on a swing path of the brake portion.

11. The moving mechanism according to claim 1, wherein the brake module comprises:
   an air pump, assembled to the bracket; and
   an inflatable brake pad, connected to the air pump, wherein the control module inflates the inflatable brake pad by using the air pump, so that the inflatable brake pad abuts against the first wheel, or the control module deflates the inflatable brake pad by using the air pump, to adjust a correspondence between the inflatable brake pad and the first wheel.

12. The moving mechanism according to claim 11, wherein the first wheel comprises:
   a wheel carrier, pivoted to the bracket, wherein the inflatable brake pad is disposed on the wheel carrier; and
   a wheel, rollably and pivotally connected to the wheel carrier, wherein at least one brake portion of the inflatable brake pad faces toward the wheel, so as to move close to and abut against the wheel while the inflatable brake pad being inflated.

13. The moving mechanism according to claim 1, further comprising:
   a touch sensor, communicating with the control module, wherein a user gets control of the control module through touching the touch sensor.

14. The moving mechanism according to claim 13, wherein the verification module is disposed on a handlebar of the object.

15. The moving mechanism according to claim 13, wherein the control module, the sensing module, and the verification module constitute an integrated electronic module, disposed on a handlebar of the object, and the integrated electronic module controls the brake module through wired communication or wireless communication.

16. A mobile carrier, comprising:
   a body; and
   a moving mechanism, comprising:
   a bracket, assembled to the body;
   a first wheel and a brake module, assembled to the bracket;
   a control module, communicating with and driving the brake module; and
   a sensing module, comprising an acceleration sensor, wherein the sensing module communicates with the control module, wherein the control module adjusts a brake force of the brake module on the first wheel based on the orientation of the body;
   wherein the brake module comprises:
   a power source, disposed on the bracket; and
   a transmission assembly, connected between the power source and the first wheel, wherein the control module drives the first wheel to steer by using the power source and the transmission assembly, and the first wheel turns to a direction different from a travelling direction of the body,
   wherein the body comprises a second wheel, and the bracket is detachably and externally connected to the second wheel,
   wherein the bracket comprises an outer frame and a movable partition configured in the outer frame, and the second wheel abuts between the movable partition and the outer frame.

17. A luggage, configured to carry an object, wherein the luggage comprises:
   a case body; and
   a moving mechanism, comprising:
   a bracket, assembled to the case body;
   a first wheel and a brake module, assembled to the bracket;
   a control module, communicating with and driving the brake module; and
   a sensing module, comprising an acceleration sensor, wherein the sensing module communicates with the control module, wherein the control module adjusts a brake force of the brake module on the first wheel based on the orientation of the body;
   wherein the brake module comprises:
   a power source, disposed on the bracket;
   a transmission shaft; and
   a brake pad, wherein the transmission shaft is connected between the power source and the brake pad, and the control module adjusts a relationship between the brake pad and the first wheel by using the power source and the transmission shaft,
   wherein the case body comprises a second wheel, and the bracket is detachably and externally connected to the second wheel,
   wherein the bracket comprises an outer frame and a movable partition configured in the outer frame, and the second wheel abuts between the movable partition and the outer frame.

* * * * *